US011630189B2

(12) United States Patent
Boyraz et al.

(10) Patent No.: US 11,630,189 B2
(45) Date of Patent: Apr. 18, 2023

(54) MULTI-TONE CONTINUOUS WAVE DETECTION AND RANGING

(71) Applicant: The Regents of the University of California, Oakland, CA (US)

(72) Inventors: Ozdal Boyraz, Irvine, CA (US); Rasul Torun, Santa Ana, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 724 days.

(21) Appl. No.: 16/666,582

(22) Filed: Oct. 29, 2019

(65) Prior Publication Data
US 2020/0150250 A1 May 14, 2020

Related U.S. Application Data

(60) Provisional application No. 62/757,951, filed on Nov. 9, 2018.

(51) Int. Cl.
*G01S 7/491* (2020.01)
*G01S 7/4911* (2020.01)
*G01S 7/4912* (2020.01)
*G01S 7/48* (2006.01)
(Continued)

(52) U.S. Cl.
CPC ........... *G01S 7/4911* (2013.01); *G01S 7/4802* (2013.01); *G01S 7/4917* (2013.01); *G01S 17/42* (2013.01); *G01S 17/58* (2013.01)

(58) Field of Classification Search
CPC .... G01S 7/4911; G01S 7/4802; G01S 7/4917; G01S 17/42; G01S 17/58; G01S 13/347; G01S 13/36; G01S 13/582; G01S 17/36
See application file for complete search history.

(56) References Cited

U.S. PATENT DOCUMENTS

| 6,697,148 B1 * | 2/2004 | Hopwood | G01S 17/10 356/28.5 |
| 7,164,117 B2 * | 1/2007 | Breed | B60R 21/0152 250/221 |

(Continued)

FOREIGN PATENT DOCUMENTS

WO WO-2010025846 A1 * 3/2010 ............. G01S 17/58

OTHER PUBLICATIONS

Torun "Optical Methods for Ranging and Analog-to-Digital Conversion" Dissertation 2019.
(Continued)

*Primary Examiner* — Mohamed K Amara
(74) *Attorney, Agent, or Firm* — Thomas | Horstemeyer, LLP

(57) ABSTRACT

Various examples for multi-tone continuous wave detection and ranging are disclosed herein. In some embodiments, an initial signal is generated using initial radio frequency (RF) tones, and is emitted as a multi-tone continuous wave signal. The initial signal is reflected from a target and received as a reflected signal. Resultant RF tones, including a frequency and a power, are determined from the reflected signal in a frequency domain. A frequency-domain sinusoidal wave is fitted to the resultant RF tones in the frequency domain, and a distance to the target is determined using a modulation of the frequency-domain sinusoidal wave.

20 Claims, 8 Drawing Sheets

(51) Int. Cl.
*G01S 17/42* (2006.01)
*G01S 17/58* (2006.01)

(56) References Cited

U.S. PATENT DOCUMENTS

| | | | | |
|---|---|---|---|---|
| 7,463,364 | B2* | 12/2008 | Yacoubian | G01N 29/2418 356/502 |
| 9,606,234 | B2* | 3/2017 | Major, Jr. | G01S 7/499 |
| 9,805,273 | B1* | 10/2017 | Seeber | G08G 5/0026 |
| 2003/0123584 | A1* | 7/2003 | Siegel | H03H 17/0261 375/350 |
| 2004/0021875 | A1* | 2/2004 | Northby | G01P 5/20 356/498 |
| 2007/0046945 | A1* | 3/2007 | Schwiesow | G01P 5/26 356/451 |
| 2014/0016115 | A1* | 1/2014 | Shimon | G01P 3/36 356/28 |
| 2019/0312689 | A1* | 10/2019 | Opshaug | H04L 5/0007 |
| 2020/0132847 | A1* | 4/2020 | Hillard | G01S 7/4804 |
| 2020/0142068 | A1* | 5/2020 | Crouch | G01S 7/4915 |
| 2020/0371212 | A1* | 11/2020 | Rumala | G01S 7/4817 |
| 2021/0370064 | A1* | 12/2021 | Murphy | A61B 5/4812 |
| 2021/0382164 | A1* | 12/2021 | Bayer | G01C 3/00 |

OTHER PUBLICATIONS

Torun et al. "Multi-tone Modulated Continuous Wave Lidar", Department of Electrical Engineering and Computer Science, University of California, Irvine, CA, USA, 92697; 2019.

Torun et al. "Multi-tone Continuous Wave Lidar" Department of Electrical Engineering and Computer Science, University of California, Irvine, CA, USA, 92697.

Torun et al. "Realization of Multitone Continuous Wave Lidar", IEEE Photonics Journal, 2019.

Bayer et al. "Simultaneous Ranging and Velocimetry with Multi-Tone Continuous Wave Lidar", Electrical Engineering and Computer Science Department, University of California, Irvine, CA 92697 USA; Jet Propulsion Laboratory, Pasadena, CA 91109 USA; 2019 Optical Society of America.

Bayer et al. "Multi-tone Continuous Wave Lidar", Department of Electrical Engineering and Computer Science, University of California, Irvine, CA, USA, 92697; 2019.

\* cited by examiner

MULTI-TONE CONTINUOUS WAVE DETECTION AND RANGING

CROSS REFERENCE TO RELATED APPLICATIONS

This application claims priority to, and the benefit of, U.S. Provisional Application 62/757,951, filed on Nov. 9, 2018, and entitled "Multi-Tone Continuous Wave Detection and Ranging," which is incorporated herein by reference in its entirety.

STATEMENT REGARDING FEDERALLY SPONSORED RESEARCH OR DEVELOPMENT

This invention was made with government support under NASA Grant Number NNX16AT64A and ONR Award Number N00014-18-1-2845. The government has certain rights in the invention

BACKGROUND

Radio detection and ranging (RADAR) applications, as well as light detection and ranging (LIDAR), can be used for remote sensing to measure the distance of objects up to thousands of feet away. LIDAR and RADAR can find applications in technologies ranging from self-driving vehicles to atmospheric and topographical mapping. These technologies emit pulses to determine how long they take to come back after scattering from the surfaces they encounter. These surfaces can be solid, liquid, or gas/aerosol. A sensor finally uses this time information to determine distance to the object.

Though the conventional LIDAR and RADAR methods are effective, they can be time consuming due to the need for consecutive measurements. This, for example, limits the application of LIDAR in systems such as satellite monitoring, where the motion of the object prohibits its successive measurement. Also, standard LIDAR is not capable of detecting velocity information from objects it encounters.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments. In the drawings, like reference numerals designate like or corresponding, but not necessarily the same, elements throughout the several views.

DETAILED DESCRIPTION

Figure 1:
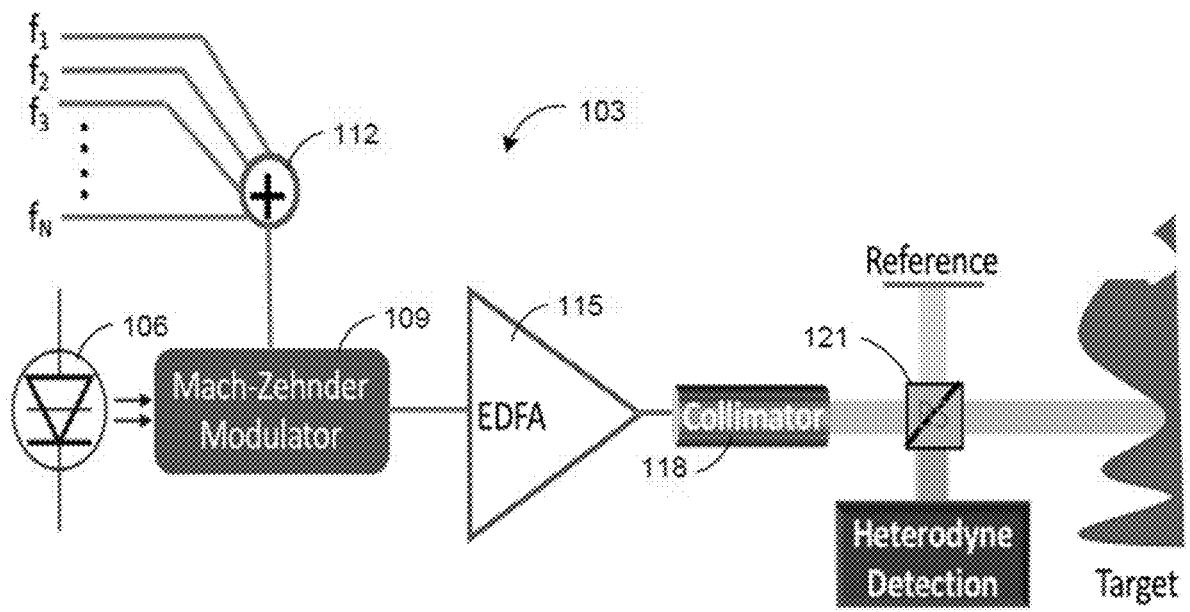
FIGS. 1-3 are drawings that illustrate example systems for multi-tone continuous wave detection and ranging, according to various embodiments.

The present disclosure relates to systems and methods that utilize multi-tone continuous wave signals for applications from range and velocity detection to atmospheric and topographical mapping. Multi-tone continuous wave (MTCW) detection and ranging is capable of simultaneous range and velocity measurements and is less susceptible to interference effects than standard techniques. This technology eliminates the time consuming frequency scan of standard LIDARS and makes single shot and fast LIDAR measurements possible. The technology is also applicable to radio detection and ranging RADAR applications. Simultaneous modulation via several RF tones makes the system faster compared to conventional FMCW LIDARs, as the need for successive measurements and need for a frequency sweep can be eliminated. The system uses a continuous wave or a quasi continuous wave, rather than pulsed, laser, and so requires less complicated optical components. Usage of several RF tones can make the system more robust, allowing for simultaneous measurement of object distance and velocity. The system can also be highly sensitive, capable of cm-scale resolution, and have high dynamic range due to coherent detection.

The present disclosure invention has all the benefits of frequency modulated continuous wave (FMCW) LIDARs bundled in a faster and simpler system. The described systems utilize a continuous wave or a quasi continuous wave, rather than a pulsed, laser, or radio wave, and rely on interference techniques to generate highly sensitive measurements. MTCW radar can be a multi RF-tone modulated interferometric radar system. The received signal has various phase delay at different tones that is converted to intensity variation after combination through a summing amplifier. The modulation strength of detected RF tones can be used to extract range information. Modulation strength at a particular tone depends on the modulation frequency and the path length. For a fixed path length, the modulation strength at RF tones can vary sinusoidally.

Aspects of the present disclosure can, for example, be utilized for standalone small spacecraft technology to achieve small, affordable, and transformative approaches to enable remote sensing systems for littoral variables such as sea surface vector winds, sea surface height etc., without sacrificing performance metrics that are achieved in conventional space and airborne technologies. For example, a laser altimetry system can measure sea surface height based on multi-tone continuous wave detection and ranging. Accordingly, a frequency shifter can be used to shift a reference signal in order to account for a relatively constant velocity of a space or airborne system. This can correct Doppler shift and detect the range information directly. Further, satellite LIDARS can observe high loss due to long distances (>400 km), therefore short pulses with high peak power and low repetition rates can be generated to compensate for losses. These low repetition rate pulses also provide coarse measurement of range while high frequency RF tones provide fine measurement. Conventional altimetry relies on time of flight measurements that can give absolute accuracy of >10 cm at long range. The present disclosure is capable of measuring sea surface height from a CubeSat with less than 4 cm accuracy.

Some aspects involve determining the relative phase delay between different RF tones and converting these delays into precise measurements of the optical path. The system can use time of flight measurements for coarse measurement of the sea surface. It can then incorporate RF tones to identify frequencies that experience constructive and destructive interferences for the given optical path. For instance, if a single RF tone is used, the tone frequency can be swept and catch peak(s) and valley(s) of the interference and detect the distance that results to 2π and π phase changes via $$\phi = 2\pi f_{RF}\Delta t = 2\pi f_{RF}\frac{L}{c}.$$

In some examples, a swept source can be utilized. However, using a swept source might not be optimal for a moving system. A satellite can be moving at ~7.7 km/s speeds, and the flight time of the light is ~2.7 ms. The present disclosure describes systems that can collect the same information in a single shot measurement by facilitating several selected tones and later fitting the tone powers on a sinusoidal signal and finding an interference pattern.

In some embodiments, an initial signal can be generated using a sum of a number of initial radio frequency (RF) tones. A signal emitter can emit the initial signal as a multi-tone continuous wave signal. The signal emitter can emit a laser, or in other cases can emit radio waves or RF electromagnetic waves. In some cases, the multi-tone continuous wave signal can be a single shot multi-tone continuous wave signal, since distance and velocity of a target can be determined using such a single shot with the variety of initial RF tones. A reflected signal can be identified. For example, the reflected signal can be a version of the initial signal reflected from a target. A signal receiver can receive backscattered light to identify the signal. The signal receiver can include an RF antenna or a receiver lens. A number of resultant RF tones (e.g., corresponding to the initial RF tones) can be determined using the reflected signal. A respective one of the resultant RF tones can include a frequency and a power. A frequency-domain sinusoidal wave can be fitted to the resultant RF tones in the frequency domain. A distance to the target can be determined using a modulation of the frequency-domain sinusoidal wave. A velocity of the target can be determined using a frequency shift between the initial RF tones and the resultant RF tones.

In some embodiments, the signal emitter can include a laser source, a Mach-Zehnder modulator, and a beam splitter. The Mach-Zehnder modulator can output the initial signal as an amplitude modulated laser beam from inputs to the Mach-Zehnder modulator that include a laser beam from the laser source and the initial RF tones. The signal emitter can also include a beam splitter that splits the amplitude modulated laser beam into an emitted component and a reference component. The reference component can be recombined with the reflected signal to generate an interference pattern from the resultant RF tones. A frequency shifter can shift the reference component for velocity compensation.

In some cases, wherein the laser source comprises a number of colored laser sources of respective colors, the initial signal can be emitted as initial laser beams corresponding to the respective colors, and the resultant signal can be received as resultant laser beams corresponding to the respective colors. This can be used for imaging, cartography, and other applications. A color of the target can be determined using a respective amplitude of each of the resultant laser beams corresponding to the respective colors. In some cases, the color lasers can be utilized along with a higher frequency laser to increase the accuracy of range finding while also determining color with the color lasers.

In radio embodiments, a summing circuit can output the sum of the plurality of initial RF tones to generate the initial signal, wherein the signal emitter comprises an antenna that emits the multi-tone continuous wave signal as electromagnetic waves such as radio waves. The signal emitter can include a power splitter that splits the initial signal into an emitted component and a reference component. Another summing amplifier or summing circuit can sum the reference component with the reflected signal to generate an interference pattern from the plurality of resultant RF tones. A frequency shifter can shift the reference component for velocity compensation.

FIG. 1 shows an apparatus 103 for laser- or LIDAR-based multi-tone continuous wave detection and ranging. A continuous wave (CW) laser source 106 can be modulated by several radiofrequency (RF) tones $f_1$-$f_N$ simultaneously via a Mach-Zehnder modulator (MZM) 109. In some cases, a summing amplifier 112 sums the RF tones and can input the summed signal into the MZM 109 to generate an amplitude or intensity modulated laser beam. In other cases, the MZM 109 can provide for input of multiple RF tones. The CW laser source 106 and the RF tones can be used as inputs to the MZM 109. The MZM 109 can output an amplitude or intensity modulated laser. In some cases, an output of the MZM 109 can be connected to an input of an optical amplifier 115 such as an Erbium-doped fiber amplifier (EDFA). The output of the optical amplifier 115 can be connected to an input of a collimator 118.

The modulated beam can be split into two components via a beam splitter 121; one component can be transmitted to the target, and the other is kept as a reference beam. After interaction with an object, the backscattered light from the first component can be recombined with the reference beam and generate an interference pattern, as described in further detail herein.

Each RF tone that modulates the CW laser can result in a unique phase shift (and resulting variation in intensity) of the interference pattern. Here, RF tones can be varied successively, and each resulting interference pattern can be directly mapped to the corresponding interference frequencies generated. These interference frequencies can be used to determine range as they are inversely proportional to the distance to the target.

This system can be modified to perform single-shot measurements. Here, several tones can be simultaneously used to modulate the beam, generating a chirped signal which has varying frequency. For a fixed path length, the modulation strength at RF tones can vary sinusoidally. The resulting interference patterns from each tone can be detected apart from one another to allow for simultaneous (rather than successive) measurement of distance. Such capability can be useful in dynamic environments, such as satellite LIDARs, where repetitive measurement of the same target location is not possible due to the target's motion. Additionally, the system can also be adapted to perform velocity measurements. For example, the Doppler frequency shift of the individual RF tones can be measured in order to determine the speed and direction of object motion. An RF spectrum analyzer can be used to analyze the spectra to identify frequency shifts and other measures in the frequency domain. The RF spectrum analyzer can perform an analysis of the interference signal in the frequency domain in order to determine the distance to the target and the velocity of the target.

In some examples, the same initial summed signal can be utilized to amplitude modulate a plurality of different lasers of different colors. Red light lasers can have a wavelength of approximately or exactly 630-680 nm. Green light lasers can have a wavelength of approximately or exactly 532 nm. Blue light lasers can have a wavelength of approximately or exactly 445 nm. Yellow light lasers can have a wavelength of approximately or exactly 593.5 nm. Multiple lasers of multiple colors, for example, a red laser, a green laser, and blue laser, can be pointed at a similar target, and the backscatter can be received for all of the colors. The target can reflect its own color while absorbing other colors. Based on the relative strength of each received color, the color of the target can be determined. In some cases, the sine fitting or sinusoidal fitting can be used based on the relative amplitude of backscattered or resultant signal for the various wavelengths. By transmitting a few colors, the relative strength of other colors can be interpolated, calculated, or inferred. Even if the colors of the lasers are not directly matched with traditional RGB or CMYK standard, the RGB or CMYK color code can be determined based on the relative amplitude or intensities of backscattered light.

Figure 2:
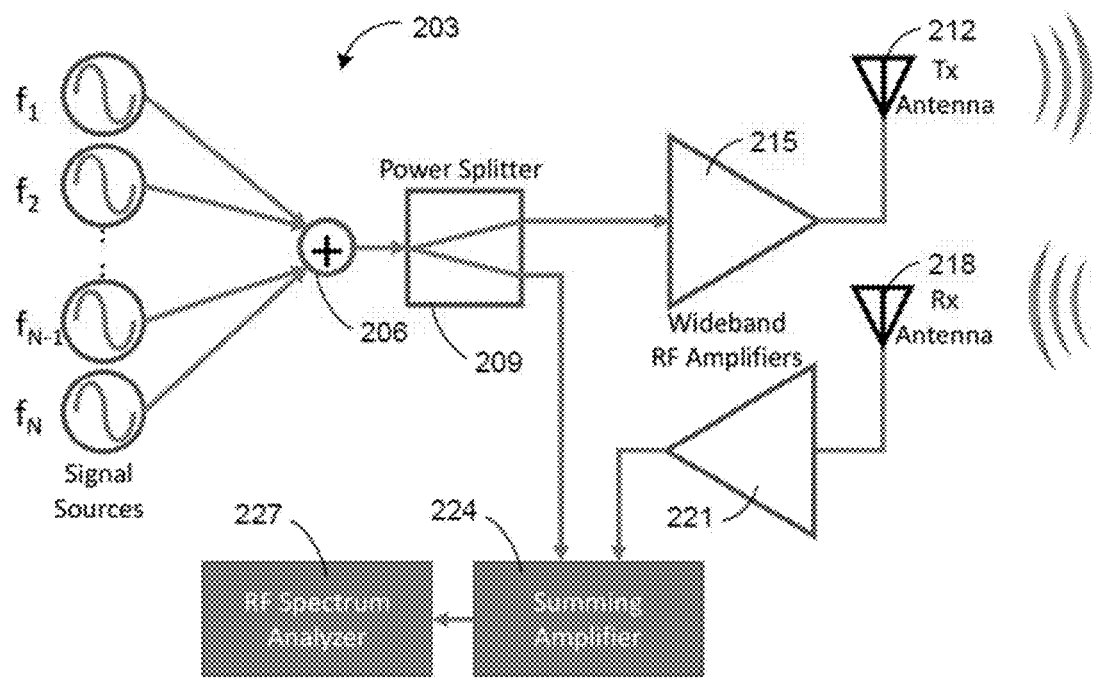

FIG. 2 shows an apparatus 203 for electromagnetic wave based multi-tone continuous wave detection and ranging. The figure shows that the concepts described herein are also applicable to radio detection and ranging (RADAR) applications. First, multiple radio frequencies $f_1$-$f_N$ can be summed up using a summing circuit 206 that includes, for example, a summing amplifier. A power splitter 209 can split the initially combined signal.

The power splitter 209 can output a portion of the combined signal as a reference signal. The combined signal can be transmitted from a single transmitter antenna 212. In some cases the signal can be amplified in an RF amplifier circuit 215. The transmitted signal can reflect and scatter from the targets around. These backscattered signals can be collected with the receiver antenna 218. In other examples, a single antenna can be used for transmission and reception. The received or resultant signal can be an output from the receiver antenna 218 to an RF amplifier circuit 221. The resultant signal can be combined or summed with the reference signal (the initial signal) within a summing amplifier 224. This can result in an interference signal. The RF spectrum analyzer 227 can perform an analysis of the interference signal in the frequency domain in order to determine the distance to the target and the velocity of the target.

The received signals can acquire time delay while propagating to the target and back. Such time delay can create different phase delays for each RF tone. Received signal can be amplified and summed with the reference to convert the phase delays to intensity variations. If the received signal and the reference signal are in phase, constructive interference can give a maximum intensity. If they are out of phase, destructive interference can result in a minimum intensity. All other cases can make intermediate changes. By applying sinusoidal fitting algorithms to a number of RF tones, additional frequencies that observe constructive and destructive interference can be interpolated or calculated, even though the system does not transmit or receive all of the tones. The range information can then be determined from time of flight calculations.

The system can be described using separate transmitter and receiver antennas. In some cases where a single transceiver antenna is used, it can be followed by a circulator to separate transmitted and received signals. In some examples, a receiver antenna array can be utilized, which includes individual receiver antennas employed to detect each RF tone. Such arrangement can also eliminate the need for wideband amplifiers.

Figure 3:
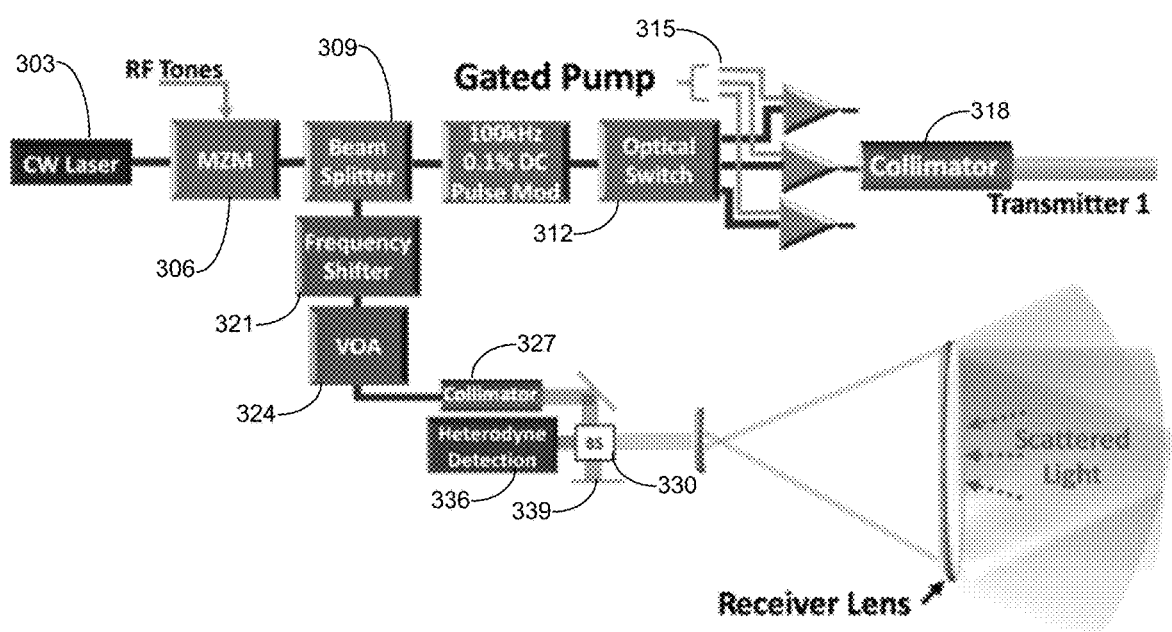

FIG. 3 is a drawing that illustrates another laser-based multi-tone continuous wave system 300. A continuous wave (CW) laser 303 can be modulated with several RF tones, for example, using a Mach-Zehnder modulator (MZM) 306, and then split into reference and transmit components by a beam splitter 309. The transmit component can be pulse modulated and directed through an optical switch 312. A gated pump 315 can output to a collimator 318 for transmission. The beam splitter 309 can output the reference component to a frequency shifter 321 and variable optical attenuator (VOA) 324 that shifts the reference component to compensate for a velocity of the system. The reference components can be directed through a collimator 327 and a beam splitter 330. Backscattered light can be directed through a receiver lens, through the beam splitter 330, and into heterodyne detection component 336.

The CW laser can, for example, include a 1064 nm laser, such as an (neodymium-doped yttrium aluminum garnet; $Nd:Y_3Al_5O_{12}$) Nd:YAG solid state laser, or a semiconductor laser, or a fiber laser. The transmit component can be further modulated with a pulse that has a 100 kHz repetition rate, a 10 ns pulse width (0.1% duty cycle), and is beamed to the Earth's surface. The transmitted light can be scattered from the atmospheric particles and sea surface and come back to a CubeSat with information related to atmospheric and oceanographic information. This can be summed with, and can interfere with, the reference signal similar to heterodyne detection. Due to the propagation, individual tones will experience different phase shifts and interference with the reference arm. For instance, a 1 GHz tone and the fundamental optical carrier can have 180° phase difference after a 30 cm propagation in free space. At the detector, the phase difference of RF tones can convert to intensity changes at the RF domain (i.e. modulation index). However, there can be a trade-off between gain due to heterodyning and modulation depth after unequal interferences of RF tones. Since the scattered light is so weak with respect to the reference arm, gain and modulation depth can be optimized by using a variable optical attenuator placed between the beam splitter 330 and a flat mirror 339 in the reference arm.

Figure 4:
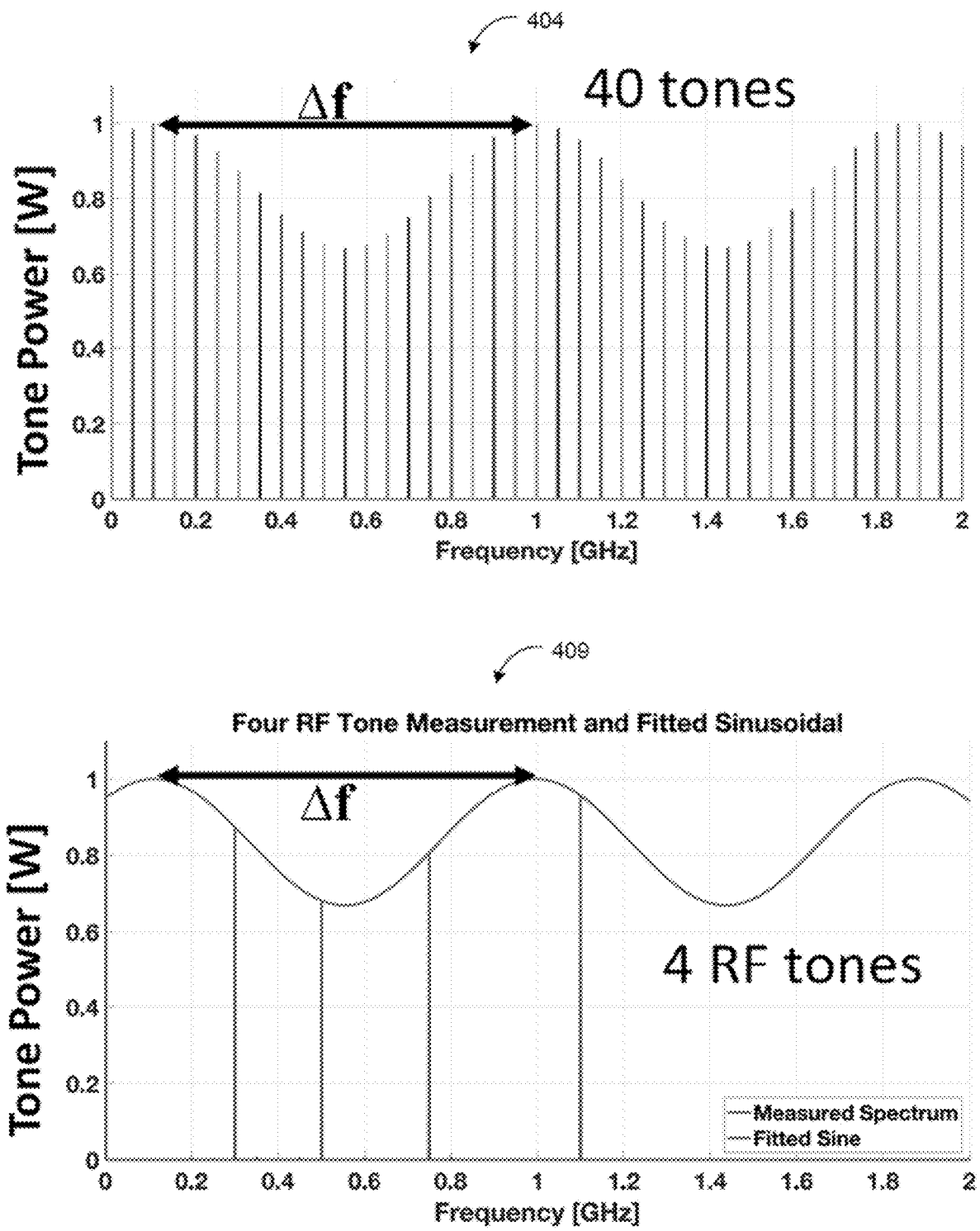
FIGS. 4-7 are graphs that illustrate principles used for multi-tone continuous wave detection and ranging, according to various embodiments.

FIG. 4 includes a graph 404 that shows an example where 40 tones are utilized. This graph 404 can represent the interference signal in a MTCW detection and ranging system that uses 40 tones. However, aspects of the present disclosure simplify the system such that this number of tones do not need to be utilized. For example, a sine fitting algorithm or sinusoidal fitting algorithm can be used to interpolate or calculate the 40 tones based on 4 or even fewer RF tones. The photocurrent of an individual RF tone at the detector is proportional to:

$$I_{\omega_{RF}} \propto \cos(\omega_{RF}t) + \cos\left(\omega_{RF}t + 2\frac{\omega_{RF}}{c}\Delta L\right)$$

where $\Delta L$ is the path difference in interferometer. Photocurrent is periodic with respect to the RF frequency and also to the distance. The graph uses multiple tones to detect the range of the target by using sine fitting. Graph 404 illustrates RF a power of 40 RF tones RF tones at the detector that can reveal range information. Graph 409 shows a fitted sine wave based on 4 RF tones. Once a sine fitting algorithm determines the sine wave, and the shift of the 4 RF tones are compared to the original or initially transmitted signal, the amplitude and frequency of each of the 40 RF tones of graph 404 can be interpolated based on the fitted sine wave and a shift of a respective one of the 4 RF tones from graph 409.

Figure 5A:
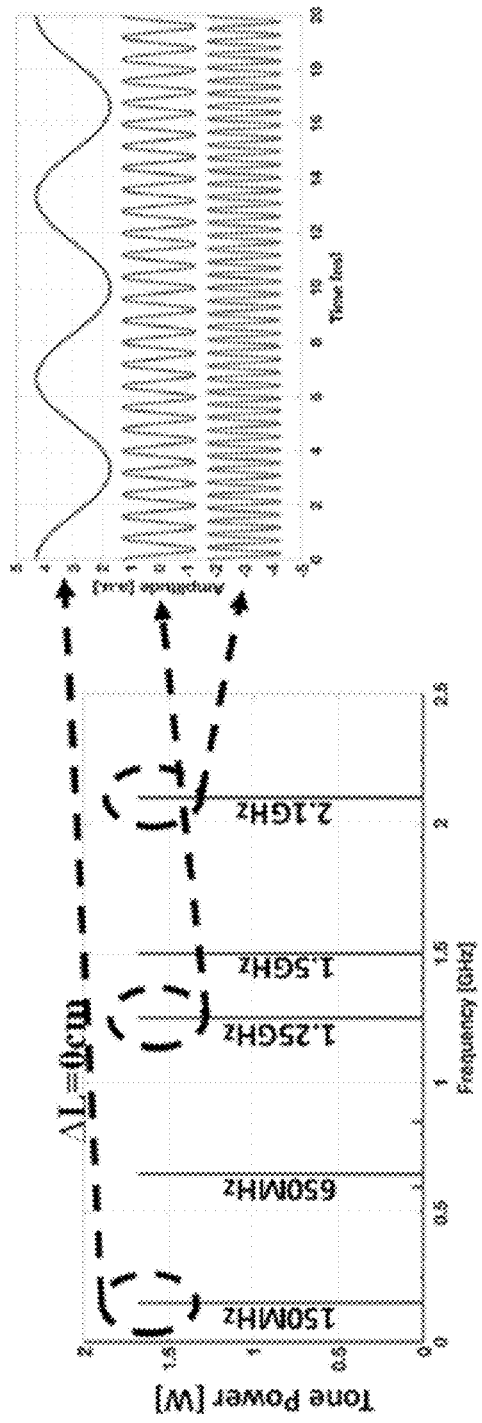

FIG. 5A includes a graph that shows an example interference signal in the frequency domain. In this example, the distance is zero. At zero distance, all tones are in-phase and constructively interfere. Therefore, all tone powers are equal as shown in RFSA (left) and Oscilloscope (right).

Figure 5B:
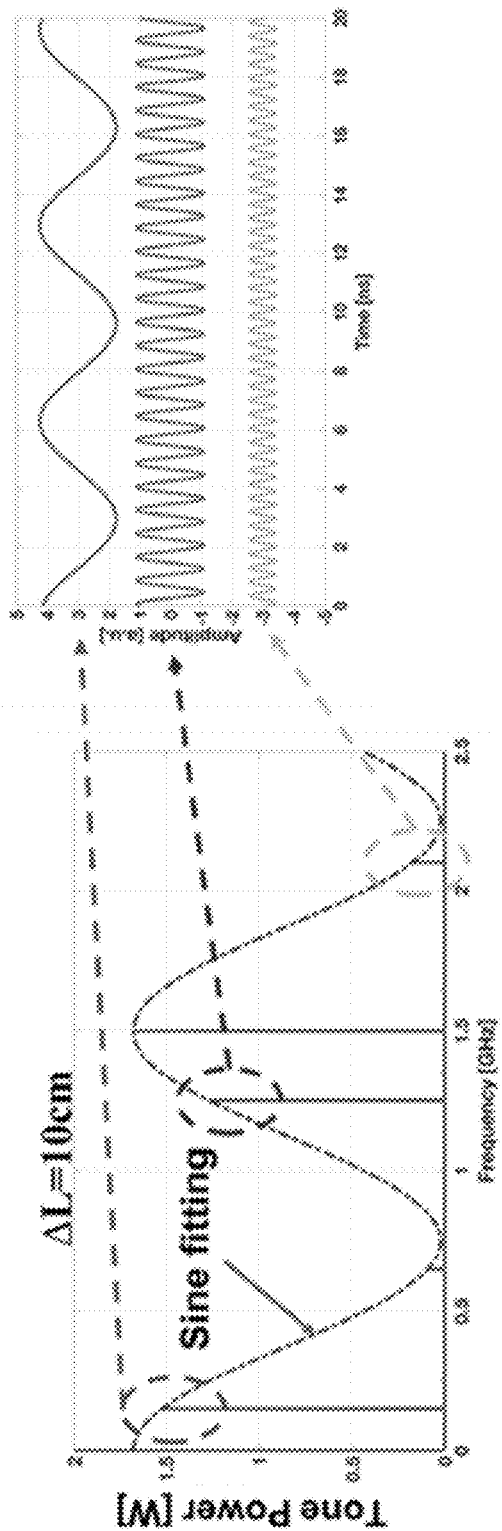

FIG. 5B includes a graph that shows an example interference signal in the frequency domain. In this example, the propagation distance is 20 cm. 1.5 GHz modulation can be observed after fitting to tone powers (left). Corresponding oscilloscope data is also provided (right).

Figure 5C:
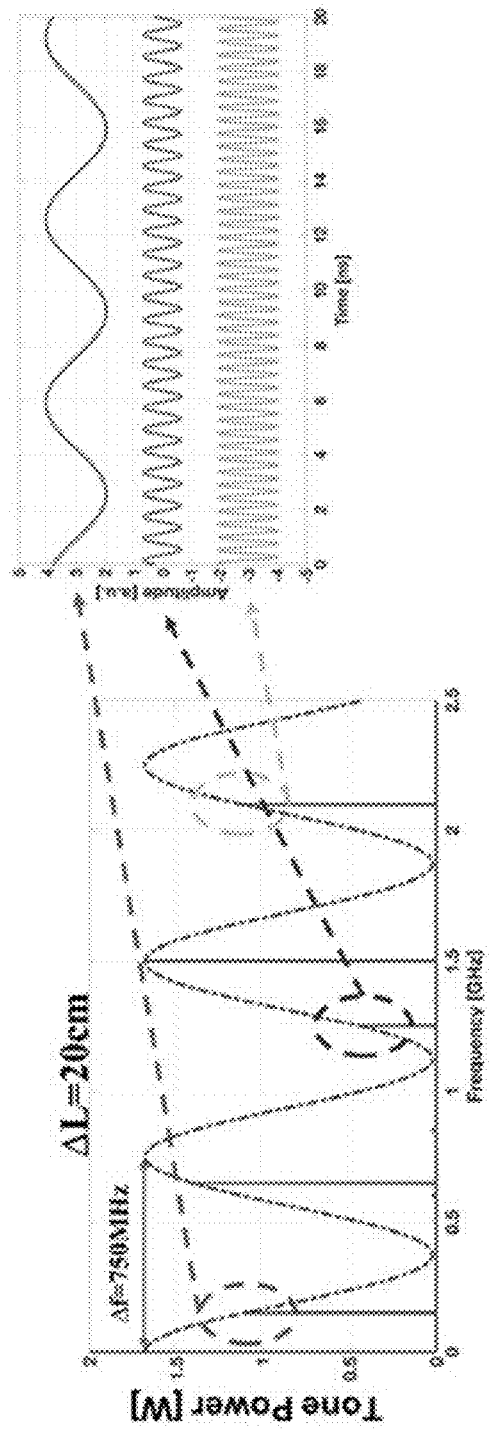

FIG. 5C includes a graph that shows an example interference signal in the frequency domain. In this example, the propagation distance is 40 cm. After 40 cm propagation ($\Delta L$=20 cm), the interference pattern generates $\Delta f=c/(2\Delta L)$ =750 MHz modulation (left). Corresponding oscilloscope data for some tones is also provided (right).

Figure 5D:
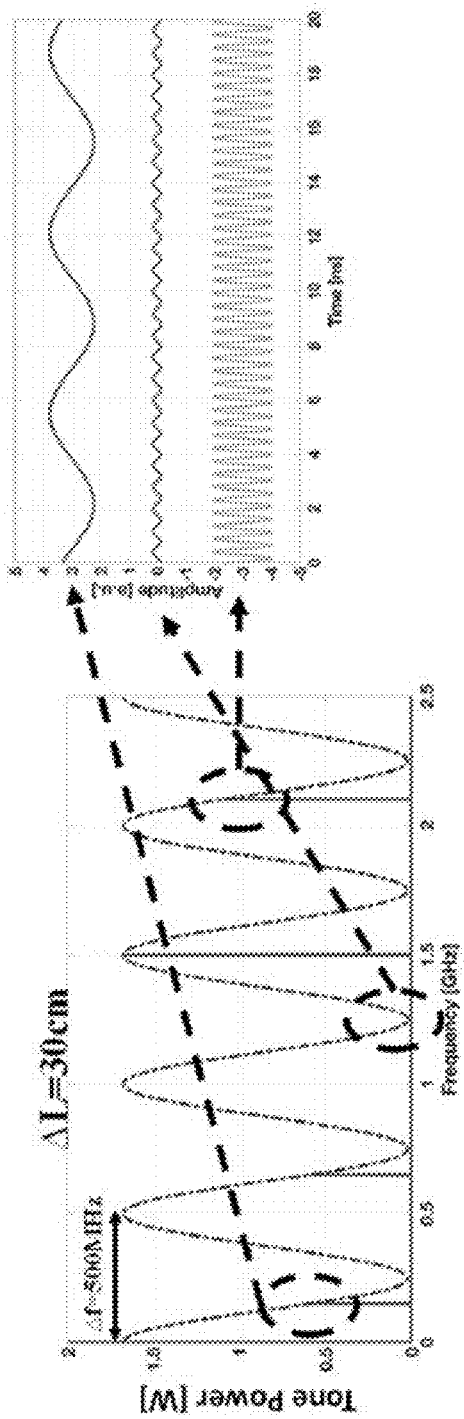

FIG. 5D includes a graph that shows an example interference signal in the frequency domain. In this example, the propagation distance is 60 cm. After 60 cm propagation ($\Delta L$=30 cm), the interference pattern generates 500 MHz modulation (left). Corresponding oscilloscope data for some tones is also provided (right).

Figure 6:
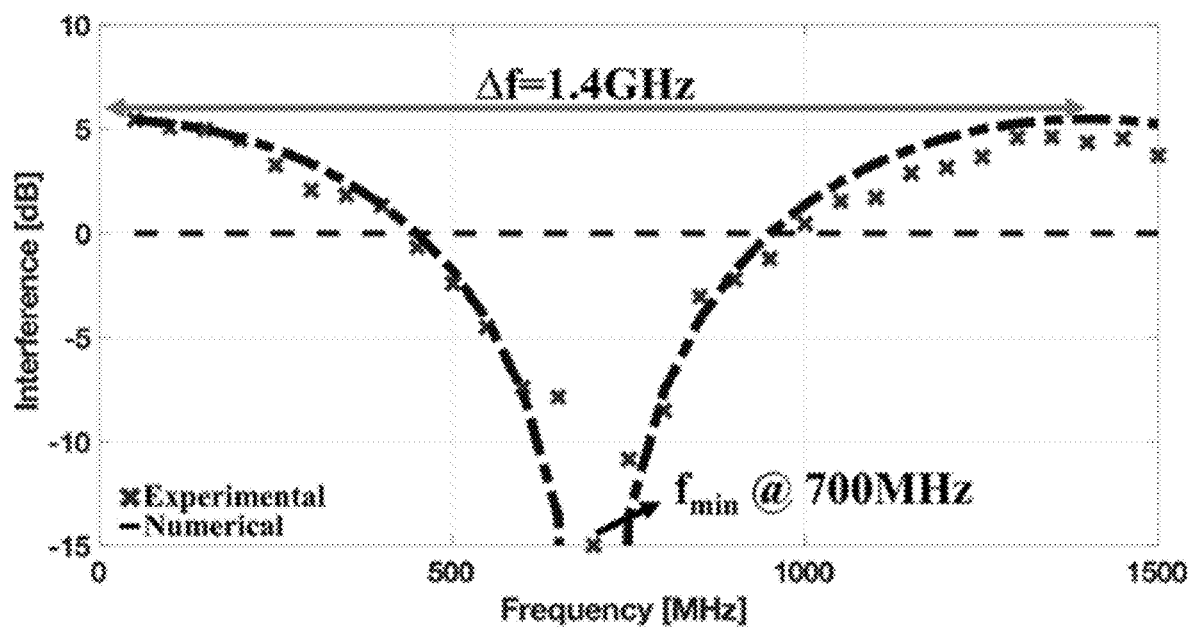

FIG. 6 includes a graph where, for a fixed distance, RF frequency is swept and interference behavior is observed. The figure demonstrates two peaks at DC and 1.4 GHz with a valley at 700 MHz, indicating that $$\Delta L = \frac{c}{2\Delta f} = 10.71 \text{ cm}.$$

It can be observed that the experimental data is well matched with numerical expectation.

Figure 7:
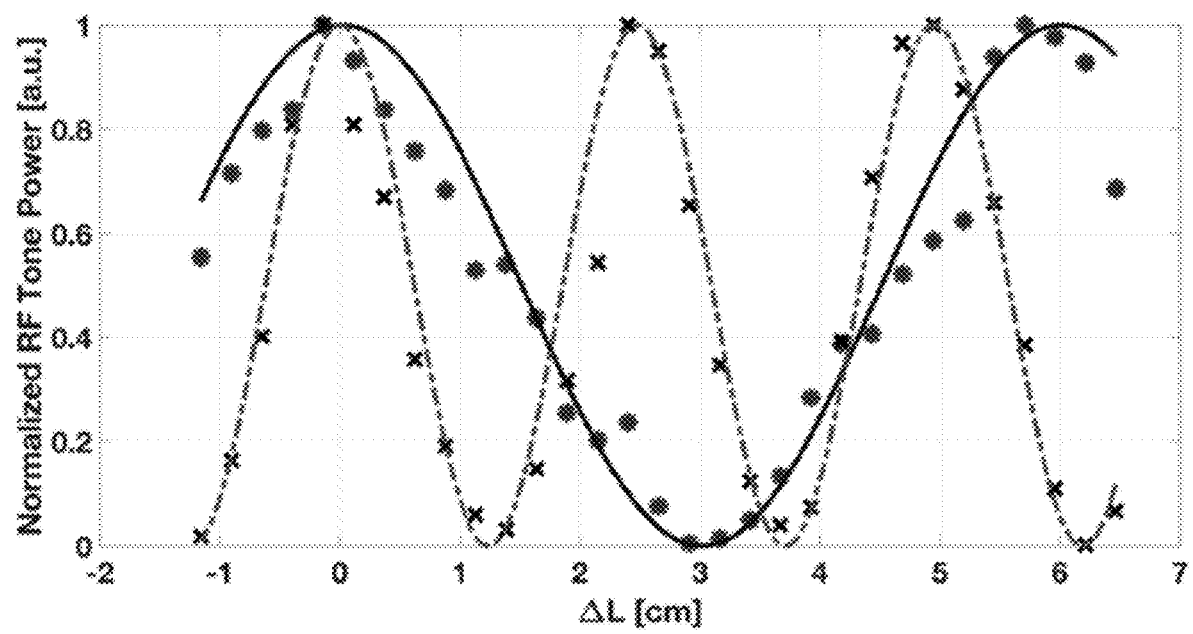

FIG. 7 includes a graph where the optical carrier is modulated by two RF tones (2.5 GHz and 6 GHz) and measurement arm is moved to observe interference. The figure shows that 2.5 GHz and 6 GHz tones are forming waveforms with 6 cm and 2.5 cm periods respectively. Here, it can also be observed that the experimental data can match with the theoretical expectation $$\Delta L = \frac{c}{2\Delta f}.$$

Figure 8:
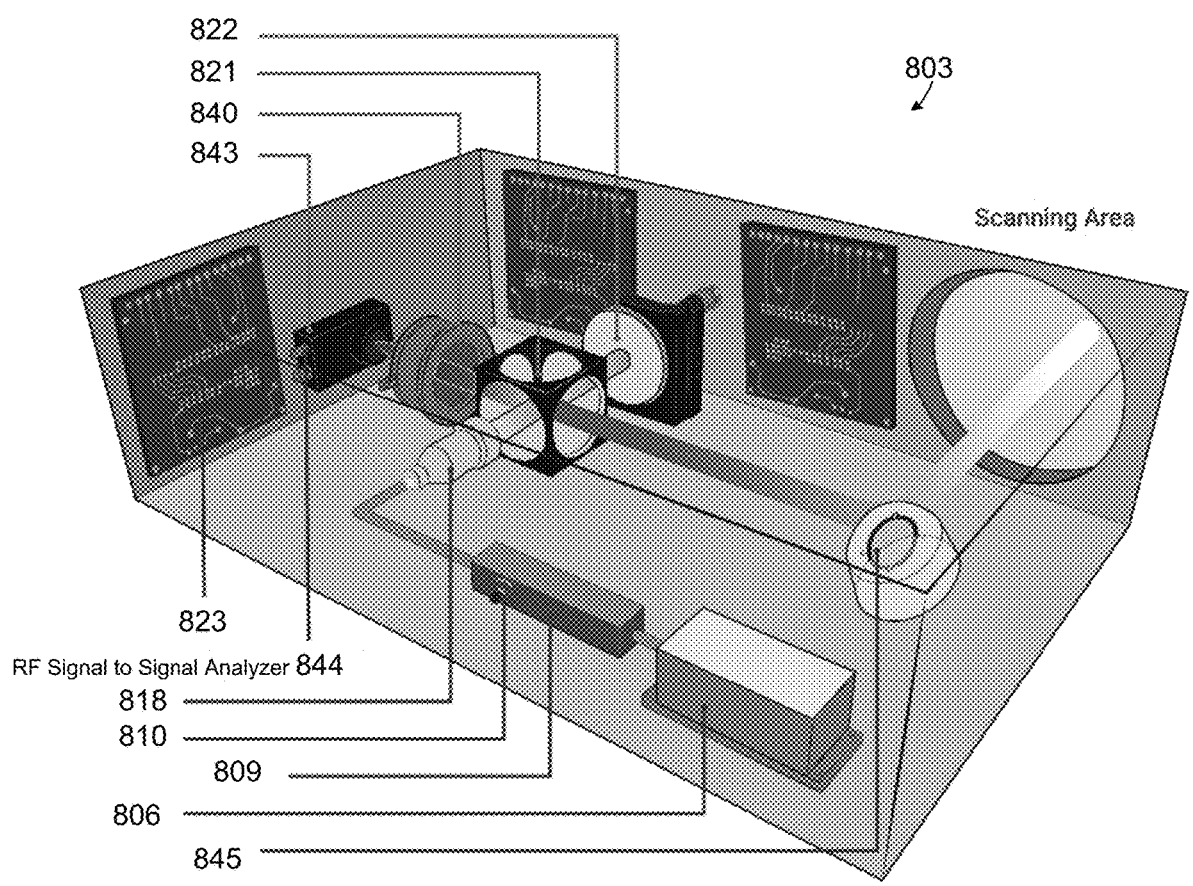
FIG. 8 is another example system for multi-tone continuous wave detection and ranging, according to various embodiments.

FIG. 8 shows an example of a system or apparatus 803 for multi-tone continuous wave detection and ranging. A Laser, LIDAR, or RADAR based system can be utilized. A continuous wave (CW) laser source 806 can be modulated by several radiofrequency (RF) tones using an amplitude modulator 809. The CW laser source 806 and an RF tone input 810 can be used as inputs to the amplitude modulator 809. The amplitude modulator 809 can output an amplitude or intensity modulated laser. The amplitude modulated laser can be input to a collimator 818. One or more apparatus 803 can be mounted on a vehicle or autonomous vehicle such as an automobile, an aircraft, a drone, a UAV, a hazardous location rover vehicle, or a space rover vehicle.

The modulated beam can be split into two components via a beam splitter 821 such as a cube beam splitter as shown; one component can be transmitted to the target, and the other is kept as a reference beam using a reference mirror 822. The apparatus 803 can also include one or more device boards 823 or device driver boards. After interaction with an object, the backscattered light from the first component can be recombined with the reference beam and generate an interference pattern, as described in further detail herein.

Each RF tone that modulates the CW laser can result in a unique phase shift (and resulting variation in intensity) of the interference pattern. The result can be fed through a focusing lens 840 and input into a photodetector 843. An RF signal can be generated by the photodetector 843 and provided to an analysis circuit 844, which can be separate from or included in the apparatus 803. The analysis circuit 844 can be included in one or more device boards 823. The beams can be emitted and subsequently detected through a mirror 845 such as a scanning mirror.

The analysis circuit 844 can include a spectrum analyzer. In some cases, the analysis circuit 844 can include an in-phase and quadrature (IQ) demodulator can be used for multi-tone continuous wave detection and ranging systems. Integration of the IQ demodulator can enhance the multi tone continuous wave technique by decreasing the computation requirements. A radio frequency IQ demodulator can detect the tone powers in analog domain and eliminate the need for high speed sampling. IQ demodulator can achieve direct detection of desired RF tone's phase and amplitude, thereby reducing data size and memory requirements.

Several tones can be simultaneously used to modulate the beam, generating a chirped signal which has varying frequency. For a fixed path length, the modulation strength at RF tones can vary sinusoidally. The resulting interference patterns from each tone can be detected apart from one another to allow for simultaneous (rather than successive) measurement of distance. Such capability can be useful in dynamic environments, such as vehicles, satellite LIDARs, where repetitive measurement of the same target location is not possible due to the target's motion. Additionally, the system can also be adapted to perform velocity measurements. For example, the Doppler frequency shift of the individual RF tones can be measured in order to determine the speed and direction of object motion. An RF spectrum analyzer can be used to analyze the spectra to identify frequency shifts and other measures in the frequency domain. The RF spectrum analyzer can perform an analysis of the interference signal in the frequency domain in order to determine the distance to the target and the velocity of the target.

Such an apparatus 803 can achieve high accuracy point cloud formation. A point cloud can refer to a set of data points defined in three dimensional space. In some cases, each point in three dimensional space can be identified based on a distance identified using multi-tone continuous wave detection and ranging, in combination with a known location of the apparatus 803, and the direction a multi-tone modulated signal is emitted. To this end, the apparatus 803 can take a distance measurement, record a point in three dimensional space. The apparatus 803 can sequentially or concurrently make a number of distance measurements and record a number of points in three dimensional space to form a point cloud. In some cases, a mirror angle of the mirror 845 can be modified for each measurement, in order to scan a particular area. The mirror angle can be used to identify the direction a multi-tone modulated signal is emitted and subsequently detected.

In some examples, the same initial summed signal can be utilized to amplitude modulate a plurality of different lasers of different colors. Red light lasers can have a wavelength of approximately or exactly 630-680 nm. Green light lasers can have a wavelength of approximately or exactly 532 nm. Blue light lasers can have a wavelength of approximately or exactly 445 nm. Yellow light lasers can have a wavelength of approximately or exactly 593.5 nm. Multiple lasers of multiple colors, for example, a red laser, a green laser, and blue laser, can be pointed at a similar target, and the backscatter can be received for all of the colors. The target can reflect its own color while absorbing other colors. Based on the relative strength of each received color, the color of the target can be determined. In some cases, the sine fitting or sinusoidal fitting can be used based on the relative amplitude of backscattered or resultant signal for the various wavelengths. By transmitting a few colors, the relative strength of other colors can be interpolated, calculated, or inferred. Even if the colors of the lasers are not directly matched with traditional RGB or CMYK standard, the RGB or CMYK color code can be determined based on the relative amplitude or intensities of backscattered light.

This process can be integrated with artificial intelligence for license plate and traffic sign recognition. For example, a license plate or a traffic sign can include raised characters, and the apparatus 803 can detect distance measurements, form a point cloud, and identify the characters in the license plate based on the resulting point cloud. In addition, where a license plate or traffic sign is flat, but the letters include a contrasting color, the colored laser process can be utilized to identify characters of the license plate or traffic sign.

Figure 9:
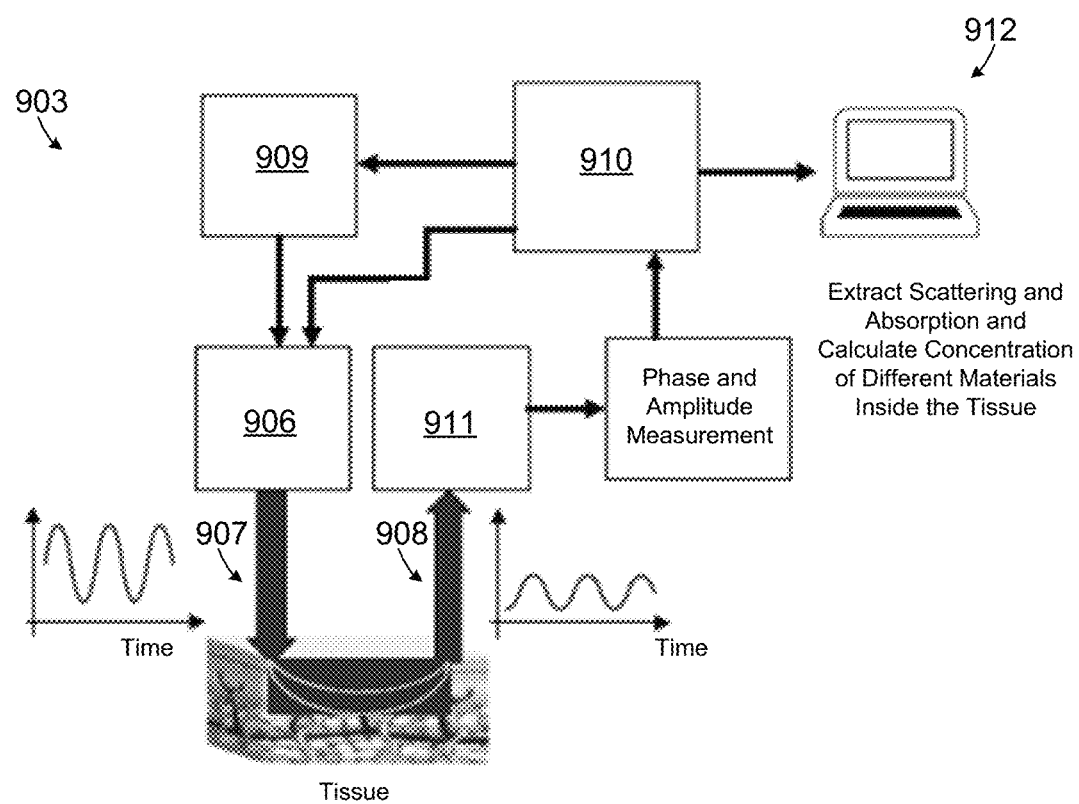
FIG. 9 is another example system for multi-tone continuous wave detection and ranging, according to various embodiments.

FIG. 9 shows another example of a system or apparatus 903 for multi-tone continuous wave detection and ranging for medical applications such as low-coherence interferometry, optical coherence tomography (OCT), diffuse optical tomography (DOT), and diffuse optical imaging (DOI).

The apparatus 903 can include a laser source 906 such as a low-coherence laser source. A laser 907 from the laser source 906 can be modulated by several radiofrequency (RF) tones using an amplitude modulator 909. The laser source 906 and an RF tone input 910 can be used as inputs to the amplitude modulator 909. The controller 910 can control the laser source 906 and the amplitude modulator 909 to modulate the laser 907 with selected radiofrequency (RF) tones. The modulated laser 907 can be emitted into organic or biological tissue. For medical applications such as low-coherence interferometry, a reflected laser and other light 908 can be detected by photo detector 911. An amplitude and phase measurement can be identified and provided to the controller 910. The controller 910, and an analysis system 912 can extract scattering and absorption to calculate concentrations of different materials inside the tissue. The analysis system 912 can include a spectrum analyzer. In some cases, the analysis system 912 can include an in-phase and quadrature (IQ) demodulator which can be used for multi-tone continuous wave detection and ranging systems. Integration of the IQ demodulator can enhance the multi tone continuous wave technique by decreasing the computation requirements. A radio frequency IQ demodulator can detect the tone powers in analog domain and eliminate the need for high speed sampling. Any of the operations described herein can be expressed as software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices. The computing devices can include processor-based systems with one or more processors.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included herein within the scope of this disclosure.

As used herein, the terms "approximate" and "approximately" can refer to values that differ about 30% more or less, about 25% more or less, about 20% more or less, about 15% more or less, about 10% more or less, or about 5% more or less than the approximate value noted.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, the following is claimed:

1. An apparatus, comprising:
    a signal emitter;
    a signal receiver; and
    at least one computing device comprising at least one processor and a data store comprising executable instructions, wherein the instructions, when executed by the at least one processor, cause the apparatus to at least:
        generate an initial signal based at least in part on a sum of a plurality of predetermined individual radio frequency (RF) tones, wherein the signal emitter emits the initial signal as a multi-tone continuous wave signal;
        identify a reflected signal, the reflected signal being a version of the initial signal reflected from a target, wherein the signal receiver receives the reflected signal;
        determine a plurality of resultant RF tones based at least in part on the reflected signal, a respective one of the plurality of resultant RF tones comprising a frequency and a power;
        fit a frequency-domain sinusoidal wave to the plurality of resultant RF tones in a frequency domain; and
        determine a distance to the target based at least in part on a modulation of the frequency-domain sinusoidal wave.

2. The apparatus of claim 1, wherein the instructions, when executed by the at least one processor, further cause the apparatus to at least:
  determine a velocity of the target based at least in part on a frequency shift between the plurality of initial RF tones and the plurality of resultant RF tones.

3. The apparatus of claim 1, wherein the signal emitter comprises:
  a laser source;
  a Mach-Zehnder modulator;
  a beam splitter; and
  wherein the Mach-Zehnder modulator outputs the initial signal as an amplitude modulated laser beam based at least in part on inputs to the Mach-Zehnder modulator comprising: a laser beam, and the plurality of initial RF tones.

4. The apparatus of claim 3, wherein the beam splitter splits the amplitude modulated laser beam into an emitted component and a reference component, wherein the reference component is recombined with the reflected signal to generate an interference pattern from the plurality of resultant RF tones.

5. The apparatus of claim 4, further comprising:
  a frequency shifter, wherein the frequency shifter shifts the reference component to compensate for a velocity of the apparatus.

6. The apparatus of claim 3, wherein the laser source comprises a plurality of colored laser sources of respective colors, the initial signal is emitted as a plurality of initial laser beams corresponding to the respective colors, and the reflected signal is received as a plurality of resultant laser beams corresponding to the respective colors.

7. The apparatus of claim 6, wherein the instructions, when executed by the at least one processor, further cause the apparatus to at least:
  determine a color of the target is based at least in part on a respective amplitude of each of the plurality of resultant laser beams corresponding to the respective colors.

8. The apparatus of claim 1, further comprising:
  a summing amplifier that outputs the sum of the plurality of initial RF tones to generate the initial signal; and
  wherein the signal emitter comprises an antenna that emits the initial signal as electromagnetic waves.

9. The apparatus of claim 8, wherein the signal emitter further comprises a power splitter that splits the initial signal into an emitted component and a reference component, wherein another summing amplifier sums the reference component with the reflected signal to generate an interference pattern from the plurality of resultant RF tones.

10. The apparatus of claim 9, further comprising:
  a frequency shifter, wherein the frequency shifter shifts the reference component to compensate for a velocity of the apparatus.

11. A method, comprising:
  generating an initial signal based at least in part on a sum of a plurality of predetermined individual radio frequency (RF) tones, wherein a signal emitter emits the initial signal as a multi-tone continuous wave signal;
  identifying a reflected signal, the reflected signal being a version of the initial signal reflected from a target, wherein a signal receiver receives the reflected signal;
  determining a plurality of resultant RF tones based at least in part on the reflected signal, a respective one of the plurality of resultant RF tones comprising a frequency and a power;
  fitting a frequency-domain sinusoidal wave to the plurality of resultant RF tones in a frequency domain; and
  determining a distance to the target based at least in part on a modulation of the frequency-domain sinusoidal wave.

12. The method of claim 11, further comprising:
  determining a velocity of the target based at least in part on a frequency shift between the plurality of initial RF tones and the plurality of resultant RF tones.

13. The method of claim 11, wherein the signal emitter comprises:
  a laser source;
  a Mach-Zehnder modulator;
  a beam splitter; and
  wherein the Mach-Zehnder modulator outputs the initial signal as an amplitude modulated laser beam based at least in part on inputs to the Mach-Zehnder modulator comprising: a laser beam, and the plurality of initial RF tones.

14. The method of claim 13, wherein the beam splitter splits the amplitude modulated laser beam into an emitted component and a reference component, wherein the reference component is recombined with the reflected signal to generate an interference pattern from the plurality of resultant RF tones.

15. The method of claim 14, wherein a frequency shifter shifts the reference component for velocity compensation.

16. The method of claim 13, wherein the laser source comprises a plurality of colored laser sources of respective colors, the initial signal is emitted as a plurality of initial laser beams corresponding to the respective colors, and the reflected signal is received as a plurality of resultant laser beams corresponding to the respective colors.

17. The method of claim 16, further comprising:
  determining a color of the target is based at least in part on a respective amplitude of each of the plurality of resultant laser beams corresponding to the respective colors.

18. The method of claim 11, further comprising:
  outputting, from a summing circuit, the sum of the plurality of initial RF tones to generate the initial signal, wherein the signal emitter comprises an antenna that emits the multi-tone continuous wave signal as electromagnetic waves.

19. The method of claim 18, wherein the signal emitter further comprises a power splitter that splits the initial signal into an emitted component and a reference component, wherein another summing amplifier sums the reference component with the reflected signal to generate an interference pattern from the plurality of resultant RF tones.

20. The method of claim 19, wherein a frequency shifter shifts the reference component for velocity compensation.

* * * * *